US005246522A

United States Patent [19]

Cordery et al.

[11] Patent Number: 5,246,522

[45] Date of Patent: Sep. 21, 1993

[54] METHOD OF MAKING DEACTIVATABLE ELECTRONIC ARTICLE SURVEILLANCE MARKERS

[75] Inventors: Robert A. Cordery, Danbury; Charles F. Murphy, III, Fairfield, both of Conn.

[73] Assignee: Pitney Bowes Inc., Stamford, Conn.

[21] Appl. No.: 845,570

[22] Filed: Mar. 4, 1992

Related U.S. Application Data

[62] Division of Ser. No. 636,155, Dec. 31, 1990, abandoned.

[51] Int. Cl.[5] .............................................. B32B 31/00

[52] U.S. Cl. .................................... 156/297; 428/294; 428/900; 340/572

[58] Field of Search ...................... 428/294, 295, 900; 340/551, 572; 156/65, 178, 179, 297

[56] References Cited

U.S. PATENT DOCUMENTS 4,568,921 2/1986 Pokalsky ........................ 340/551 X
4,665,387 5/1987 Cooper et al. ...................... 340/572

*Primary Examiner*—David A. Simmons
*Assistant Examiner*—Chester T. Barry
*Attorney, Agent, or Firm*—Peter Vrahotes; Melvin J. Scolnick

[57] ABSTRACT

A deactivatable electronic article surveillance marker is produced by placing elongated magnetically soft elements on a support and aligning short sections of magnetically semi-hard wires parallel to one another in bands with the bands being perpendicular to the elongated ferromagnetic materials. In another embodiment a criss-cross configuration of magnetically soft elements are provided and the bands of magnetically semi-hard wires are placed diagonally relative to the crisscross elongated soft magnetic elements.

1 Claim, 2 Drawing Sheets

METHOD OF MAKING DEACTIVATABLE ELECTRONIC ARTICLE SURVEILLANCE MARKERS

This application is a divisional continuation of U.S. application Ser. No. 07/636,155, filed Dec. 31, 1990, now abandoned.

BACKGROUND OF THE INVENTION

A high degree of interest has been shown over the past years in the field of theft detection using electronic article surveillance systems wherein electronically sensitive devices, know as markers, are introduced into a electromagnetic field known as an interrogation zone, to emit a signal in response to such magnetic field. Electronic article surveillance (EAS) systems and markers for use therein were disclosed by P. A. Picard in French Patent Number 763,681 (1934). Generally, certain ferromagnetic alloys exhibit high magnetic permeability and low coercivity thereby making their use as EAS marker attractive. Materials for such markers have been made as disclosed in U.S. Pat. Nos. 4,581,524 and 4,568,921 and U.S. Pat. application having Ser. No. 290,547 U.S. Pat. No. 5,003,291. Although these markers generally work well, without the ability to deactivate such markers, i.e. rendering them unresponsive in an interrogation zone, the use of EAS systems becomes limited. For example, when an article with a marker attached thereto is purchased in a first store and the purchaser subsequently enters a second store with the article bearing the marker, the marker could generate an alarm in the EAS system of the second store unless measures are taken to avert the same. As is generally known, there are walk around systems as used in institutions such as libraries where the books are checked out. Thereafter, the individual walks through the gates of the EAS system without the book and is then given the book as it is it is passed around the gates. Although this system works well in controlled areas, such as libraries, it is not adequate in the commercial use of EAS systems.

In U.S. Pat. No. 3,747,086, a deactivatable marker is described that has a soft magnetic strip which is detectable in an interrogation zone of an EAS system. In addition to such soft magnetic strip, two hard magnetic strips elements are placed adjacent to the soft magnetic strip and these have distinctive magnetic properties which are not the same as the detectable soft magnetic strip After a marker has been used for the purposes of theft detection, it is then deactivated by placing the marker in a magnetic field of high strength to magnetize the two hard magnet strips thereby rendering the marker undetectable. Although this marker functions adequately, it requires a relatively high magnetic field in order to deactivate the marker. Such high magnetic field is not only energy inefficient, and expensive, but also could present health hazards to those about the high magnetic field for extended periods. Furthermore, a relatively high amount of magnetic material is used in such prior art deactivatable markers.

It clearly would be advantageous to provide an EAS marker that can be readily deactivated in a relatively low magnetic field and uses a low quantity of magnetic material.

BRIEF SUMMARY OF THE INVENTION

This invention is concerned with the field of theft detection using an electronic article surveillance (EAS) system. More particularly, it is directed to deactivatable EAS markers and method of making the same. Elongated soft magnetic materials responsive to a interrogation zone are aligned on a surface label so as to provide a signal when introduced into an interrogation zone of an EAS system. Shorter length wire of magnetically hard materials are aligned with the magnetically soft materials and secured with the latter to a support member. When the marker is to be deactivated, it is introduced into a relatively high magnetic field to magnetize the wires. With such magnetization of the wires, when a marker is reintroduced into an interrogation zone, a detectable signal will not be generated by the marker.

BRIEF DESCRIPTION OF THE DRAWING

With reference to the drawing wherein like numbers are used for like elements

DETAILED DESCRIPTION OF THE PREFERRED EMBODIMENT

Figure 1:
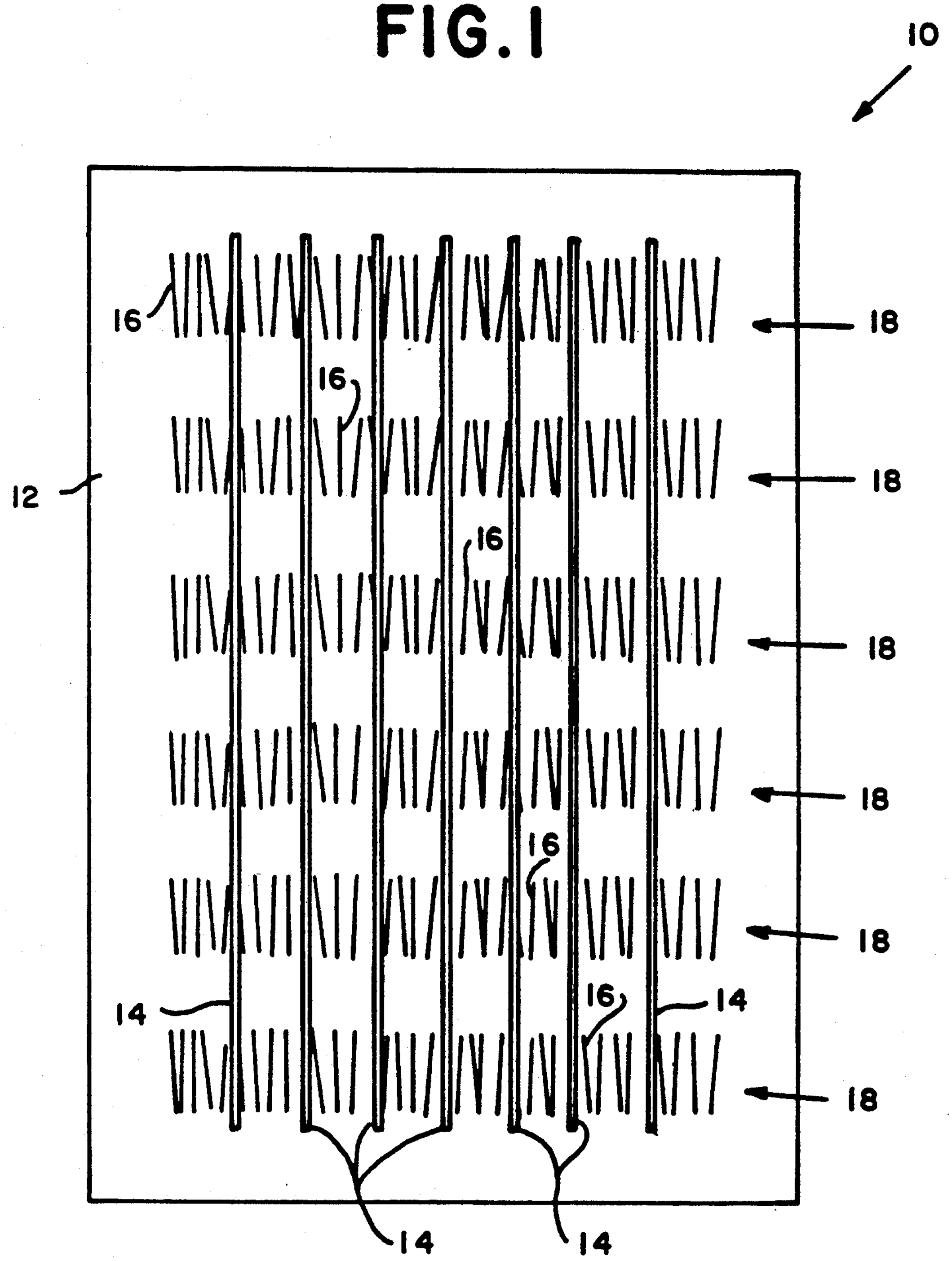
FIG. 1 is a plan view of an EAS marker made in accordance with instant invention and, FIG. 2 is a plan view of an alternative structure of an EAS marker made in accordance with the instant invention.

With initial reference to FIG. 1, an EAS marker is shown generally at 10 and includes a support 12, such as paper or plastic tape, to which a plurality elongated magnetically soft elements 14 are attached. As shown, the soft magnetic elements 14 are in the form as described in U.S. Pat. application Ser. No. 290,547, U.S. Pat. No. 5,003,291 which will have a coercivity of less than oneoersted. Although the invention is described in connection with the use of fibers, it will be appreciated that other forms of elongated soft magnetic materials can be used such as in strip form as described in U.S. Pat. No. Re 32,427 or wires as described in U.S. Pat. No. 4,568,921.

The magnetically soft elements 14 are attached to the support 12 as by an adhesive. Normally, the marker 10 will have the soft magnetic fibers 14 secured by a second support member that overlies and is attached to the first support member 12, as by adhesives, but for purposes of clarity and convenience, the invention will be described in conjunction with the use of only one support member 12. In any case, the soft magnetic fibers 14 are generally 1 to 2 mils in diameter and parallel to one another. Adjacent to and intermediate the soft magnetic fibers 14 are a plurality of semi-hard magnetic wires 16 made of a material such vicalloy (38% Fe, 50% Co and 12%V). Generally, the semi-hard magnetic material will have a coercivity of 50 to 300 Oe and a reminence of 8,000 to 12,000 Gauss. The lengths of the semi-hard magnetic wires 16 should be approximately 0.067 inches when used with the soft magnetic fibers 14, but the length of such wires may be between 0.032 and 0.10 inches depending upon the type of soft magnetic element with which it is used. The diameter of the wires should be 0.5 mils to 2.0 mils depending upon the diameter or quantity of the soft magnetic fibers 14. As can be seen, the semi-hard magnetic wires 16 are aligned in a plurality of laterally extending rows, six such rows being seen in FIG. 1 and the wires within each row are generally parallel to one another and located adjacent to the outside fibers 14 and intermediate all of the fibers.

One mil vicalloy wire was sectioned into lengths of approximately 0.67 inches. An amount of wire was weighed equal to 1.5 to 4 times the amount of fiber 14 present on the support 12. The wires were layered randomly over of the parallel fibers on the support 12. The support 12 was then placed upon a strip magnet having 10 or more poles per inch (ppi) and a strength of 600 Gauss so that the magnetic wires 16 were shorter than the pole spacing of the strip magnet.

The strip magnet was vibrated and the short wires 16 settled in an orientation similar to the pole configuration of the strip magnet. After settling, adhesive was applied to the support 12 to hold the fibers 14 and wires 16. Alternatively the wires 16 can also be aligned by applying an AC electromagnetic field in short bursts instead of vibrating over a magnetic strip.

The final configuration of the wires 16 consists of bands 18 of short wires, which bands are disposed perpendicular to the fibers 14 as seen in FIG. 1. The short wires 16 that make up each band 18 are aligned generally parallel to the fibers 14. Such a marker 10 is readily detectable in a magnetic field of 2 $O_e$.

The configuration described results in the short wires 16 magnetically biasing the longer fibers 14 in specific areas along the lengths of the fibers 14 after the wires 16 have been magnetized. This biasing of sections makes the fibers 14 appear as if they were actually multiple short magnetic elements thereby effectively reducing the magnetic aspect ratio of the fibers. As the aspect ratio of the fibers 14, length to diameter ratio, decreases below 400, the signal of the fibers degrades. As a consequence, the greater the magnetic sectioning of the fibers 14 by the shorter wires 16, the greater the switching signal will be altered after the short wires are magnetized. Alteration of the fiber 14 signals will result in the EAS detection gates discriminating against the original signal after the marker 10 has been deactivated. Such magnetization of the semi-hard magnetic short wires 16 is accomplished by placing the marker 10 in a magnetic field of 200 to 600 Oe with the wires being parallel to the flux of the magnetic field. After such magnetizing of the wires 16, the markers will not be detected in an interrogation zone, particularly they will not be detected in a interrogation zone of greater than 25 $O_e$.

It is possible to fabricate the wire deactivation process within a marker 10 with as low as a 1.5:1 ratio of deactivation material 16 to soft magnetic material 14 with a ratio range of 2:1 to 4:1 being acceptable. This low amount of semi-hard magnetic material is only possible because the wires 16 are all aligned parallel to each other. When an external field of 200 to 6000 e is applied and is parallel to the wires, all the wires 16 are fully magnetized. In this case, the deactivation material is used in its most efficient magnetic state. If the wires were randomly placed, the applied field would only fully saturate the wires that were parallel to the field. The magnetization of the non-parallel wires would be proportional to the angle between the magnetizing field and the wire. This is a poor and inefficient use of the material's magnetic properties and would force a higher amount of semi-hard to deactivate the marker 12. If the wires 16 are too randomly oriented, deactivation may not be possible at all.

It was been found that markers of this type are particularly advantageous because the magnetic aspect ratio of the fibers 14 are affected rather than a masking of the soft magnetic materials as is taught in the prior art.

Figure 2:
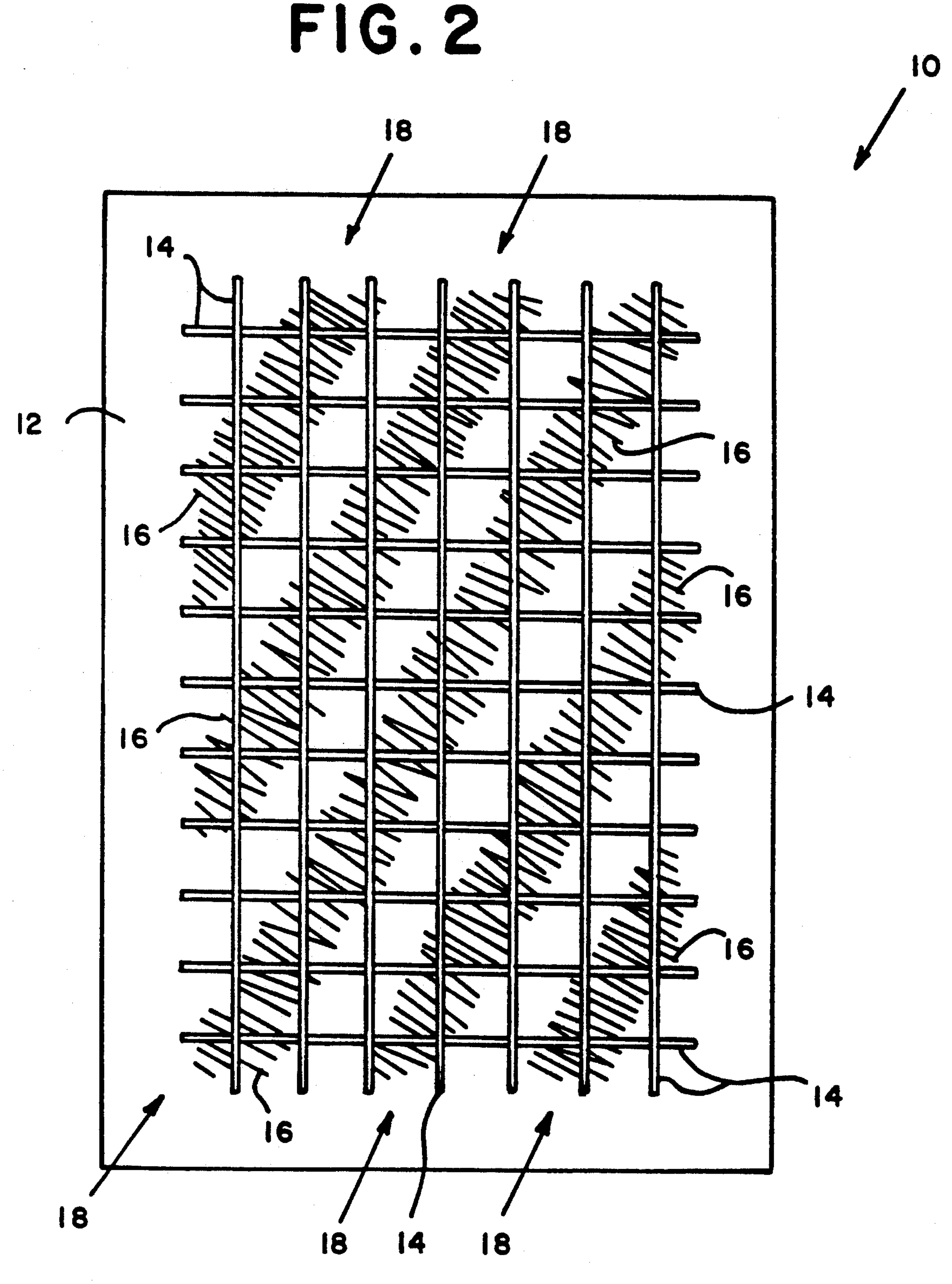

With reference now to FIG. 2, another embodiment of the instant invention is shown in connection with a label 10A, having a support 12 and fibers 14 aligned on a criss-cross pattern, i.e, two sets of a plurality of fibers each set aligned perpendicular to the other. Semi-hard magnet wires 16 are aligned in bands 18 with the bands being oriented diagonally relative to the fiber 14. Using this configuration, it has also been found that such markers 10A have a greater pick rate. The short wires 16 are placed in diagonal rows 18 as seen in FIG. 2 to assure deactivation of the marker 10A after magnetization of the short wires.

What is claimed is:

1. A method comprising the steps of:

(a) providing a planar support member, (b) placing on the support member two sets of a plurality of parallel elongated magnetically soft elements having a coercivity of less than one Oersted whereby each set is aligned perpendicular to the other, (c) placing on the support member a plurality of substantially parallel bands, each band comprising a plurality of substantially parallel magnetically semi-hard magnetic wires having a coercivity of 50–300 Oersted and a reminence of 8,000–12,000 Gauss and said bands are oriented diagonally relative to the elongated magnetically soft elements, and (d) adhering said soft elements and said semi-hard wires to the support member whereby the article made by this method is capable of functioning as an electronically sensitive marker in an article surveillance system.

* * * * *